US011143508B2

(12) United States Patent
Mitchell et al.

(10) Patent No.: US 11,143,508 B2
(45) Date of Patent: Oct. 12, 2021

(54) HANDHELD DEVICE FOR CALCULATING LOCATIONS COORDINATES FOR VISIBLE BUT UNCHARTED REMOTE POINTS

(71) Applicants: Abraham Joseph Mitchell, Brigham City, UT (US); Terry Alan Wheelwright, Morgan, UT (US)

(72) Inventors: Abraham Joseph Mitchell, Brigham City, UT (US); Terry Alan Wheelwright, Morgan, UT (US)

(*) Notice: Subject to any disclaimer, the term of this patent is extended or adjusted under 35 U.S.C. 154(b) by 202 days.

(21) Appl. No.: 16/238,244

(22) Filed: Jan. 2, 2019

(65) Prior Publication Data

US 2020/0208976 A1    Jul. 2, 2020

(51) Int. Cl.
*G01C 21/00* (2006.01)
*G01S 19/45* (2010.01)
*G01C 9/00* (2006.01)
*H04N 5/232* (2006.01)
*G01C 17/00* (2006.01)
*G06F 3/0481* (2013.01)

(52) U.S. Cl.
CPC .......... *G01C 21/005* (2013.01); *G01C 9/00* (2013.01); *G01C 17/00* (2013.01); *G01S 19/45* (2013.01); *H04N 5/232945* (2018.08); *G06F 3/04815* (2013.01); *G06F 3/04817* (2013.01)

(58) Field of Classification Search
CPC ........ G01C 21/005; G01C 9/00; G01C 17/00; G01C 15/00; G01S 19/45; G01S 19/51; H04N 5/232945; H04N 5/232939; G06F 3/04815; G06F 3/04817
See application file for complete search history.

(56) References Cited

U.S. PATENT DOCUMENTS

| 6,420,994 | B1 * | 7/2002 | Chumbley | .............. | G01S 13/75 342/118 |
| 6,816,782 | B1 | 11/2004 | Walters et al. | | |
| 2015/0233712 | A1 * | 8/2015 | Knapp | ...................... | F41G 3/02 702/95 |
| 2016/0158942 | A1 * | 6/2016 | Augenbraun | .......... | B25J 9/1694 700/253 |

* cited by examiner

*Primary Examiner* — Russell Frejd
(74) *Attorney, Agent, or Firm* — Thorpe North & Western, LLP

(57) ABSTRACT

A navigational device includes a microprocessor, a target marking system, a digital tilt sensor, and a digital compass to determine mapping coordinates of a remote point from an observation point. A user first visually targets the remote point using the target marking system. The digital tilt sensor then determines an angle of inclination to the remote point from the observation point. The digital compass then determines a bearing angle to the remote point from the observation point. The GPS module then determines the GPS coordinates of the observation point. Lastly, the microprocessor determines mapping coordinates of the remote point based upon the angle of inclination data, the angle of bearing data, and the GPS coordinates of the observation point.

13 Claims, 9 Drawing Sheets

HANDHELD DEVICE FOR CALCULATING LOCATIONS COORDINATES FOR VISIBLE BUT UNCHARTED REMOTE POINTS

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND

1. The Field of the Present Disclosure

The present disclosure relates generally to GPS enabled navigation devices.

2. Description of Related Art

Navigation is the art of traversing the Earth from one location to another. Navigators often plan a route using waypoints which are intermediate or stopping points on the route. For centuries, a magnetic compass and paper map were the tools of navigators. In modern day, however, a satellite-based navigation system, known as the Global Positioning System (GPS), has all but relegated magnetic compasses and paper maps to hardcore outdoor enthusiasts, orienteering clubs, and geography buffs.

A GPS navigation device, GPS receiver, or simply GPS, is a device that receives information from GPS satellites and then calculates the device's geographical position with longitudinal and latitudinal coordinates. Using suitable software, the GPS device may display its position on a digital map with an icon. A GPS device may also provide directions or route information between two locations. To facilitate this process, geographic locations are often "charted" by the GPS device. As used herein, the term "charted," and its grammatical equivalents, means that the coordinates of a specific location are known. Charting of the current coordinates of a GPS device may occur in real time. The charting of other locations may be previously determined and stored in a database. For example, the coordinates of popular or previously marked locations may be stored in a memory of the GPS device. For example, vehicle GPS navigation systems allow a user to select an address of a previously charted destination. The GPS navigation system will then provide real-time directions to the location from its current location.

Correspondingly, the term "uncharted location" means that the coordinates of a specific location are unknown to the GPS device even though the location may appear on a general map of the area. In the outdoors, most locations are uncharted and may include minor geographical features selected by a user, including locations of clearings, rocks, and trees. An uncharted location may even include the location of an animal in the outdoors.

Handheld GPS devices exist as well to provide location and route information to hikers and other outdoor enthusiasts. Some manufacturers have even incorporated GPS capability into handheld communication radios to allow users to exchange navigation information amongst themselves. For example, U.S. Pat. No. 6,816,782 granted to Walters et al. discloses a handheld and GPS-enabled device that includes a radio transceiver. The radio transceiver is adapted to transmit and receive navigation related data and applications wirelessly between another similar handheld electronic device. This feature allows users to exchange their locations, i.e., mapping coordinates, electronically between devices using radio transmissions.

One drawback to current GPS navigation devices is that while they excel in providing route information between two locations for which mapping coordinates are available, they cannot provide route information between a location for which mapping coordinates are available, i.e., a charted location, and a location for which the exact mapping coordinates are not available, i.e., an uncharted location. This situation often occurs in the outdoors with hikers. For example, a hiker may desire to hike to a remote and uncharted location that is visible to the hiker. While the hiker's handheld GPS device can chart its current location, it cannot chart the location of the remote location. This situation is further aggravated when the hiker desires to share the exact location of the remote location to another hiker's GPS device. Thus, there exists a need in the art for a system, apparatus, and method that provides mapping coordinates for remote and uncharted locations that are visible to a user.

The prior art is thus characterized by several disadvantages that are addressed by the present disclosure. The present disclosure minimizes, and in some respects eliminates, the above-mentioned failures, and other problems, by utilizing the methods and structural features described herein.

The features and advantages of the present disclosure will be set forth in the description which follows, and in part will be apparent from the description, or may be learned by the practice of the present disclosure without undue experimentation. The features and advantages of the present disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

Figure 1:
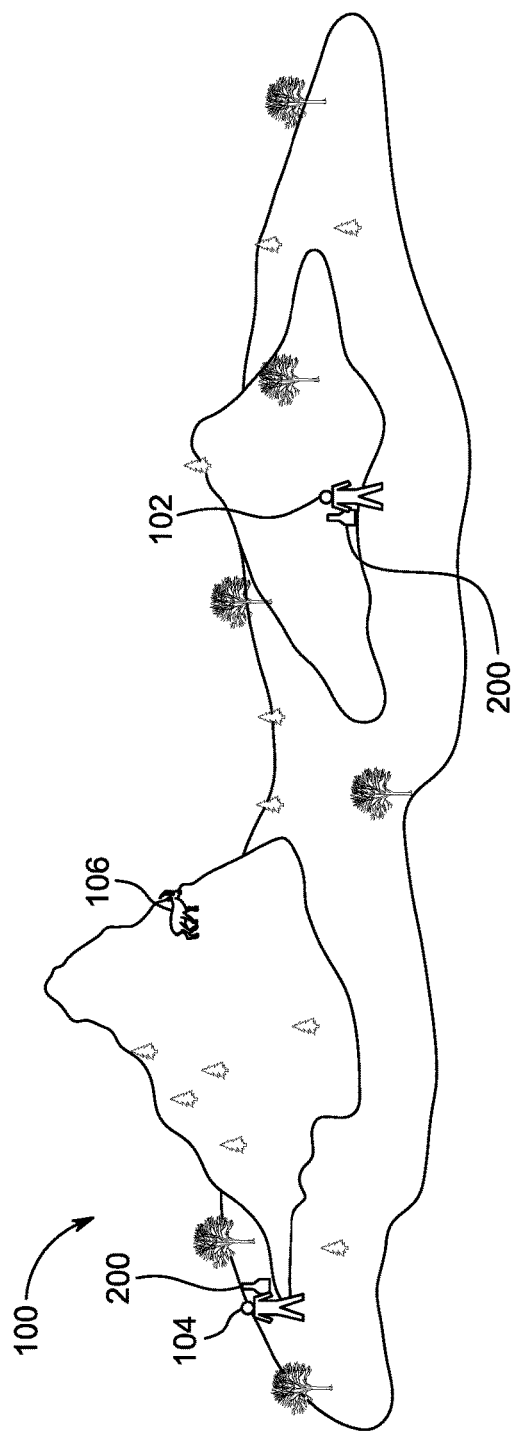
FIG. 1 depicts an outdoor scene with a first user, a second user, and an animal, all of which are separated by a distance from each other.

For the purposes of promoting and understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

In describing and claiming the present disclosure, the following terminology will be used in accordance with the definitions set out below. As used in this specification and the appended claims, the singular forms "a," "an," and "the" include plural referents unless the context clearly dictates otherwise. As used herein, the terms "comprising," "including," "having," "containing," "characterized by," and grammatical equivalents thereof are inclusive or open-ended terms that do not exclude additional, unrecited elements or method steps.

Referring to FIG. 1, there is shown a real-life outdoor scene 100 having a first user 102, a second user 104 and an animal 106. As can be observed, the first user 102 and the second user 104 are separated by a distance. This distance of separation may be as little as a few hundred feet or several miles. The first user 102 and the second user 104 are also separated by a distance from the animal 106. Again, this distance may be as little as a few hundred feet or several miles. It will be appreciated that the animal 106 is in sight of the first user 102 but not necessarily in the sight of the second user 104. Thus, the position of the first user 102 may be referred to herein as an observation point.

Both the first user 102 and the second user 104 are equipped with a navigational device 200. The navigational devices 200 of the first user 102 and the second user 104 allow them to communicate via radio transmission as well as exchange navigational data. This navigational data may include their current coordinates and the coordinates of the animal 106. As used herein, the term "coordinates" includes but is not limited to, longitudinal and latitudinal data. The current location of the first user 102 and the second user 104, i.e., the coordinates of the first user 102 and the second user 104, are determined using their respective navigational device 200.

The navigational device 200 of the first user 102 is also able to chart the coordinates of a remote point, e.g., the location of the animal 106. Prior to proceeding to this explanation, however, applicant will now disclose the components and features of the navigational device 200 according to an embodiment of the present disclosure.

Figure 7:
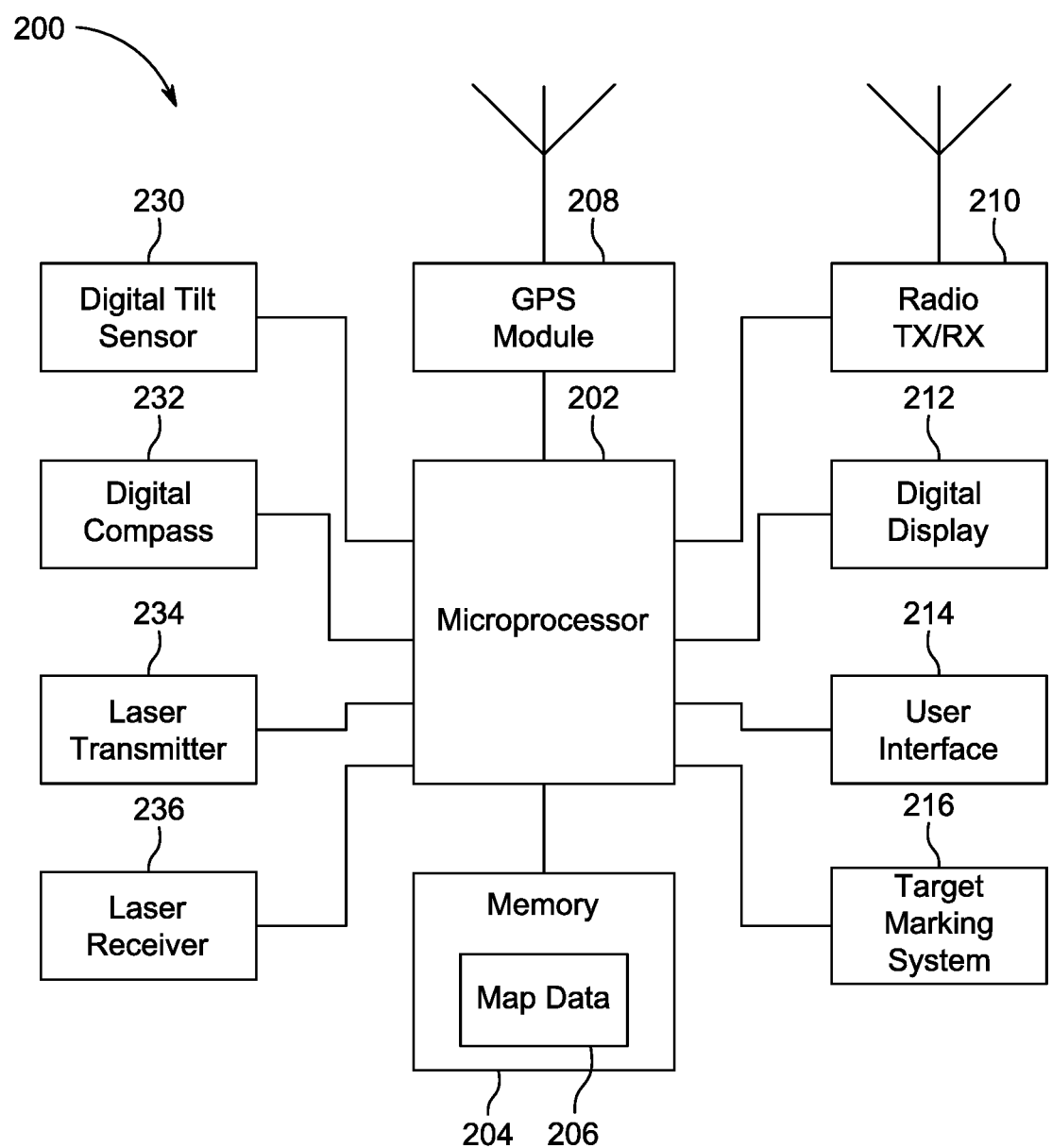
FIG. 7 depicts a diagram of the components of a navigation device according to an embodiment of the present disclosure.

Referring to FIG. 7, the components and features of the navigational device 200 according to an embodiment of the present disclosure are shown. Embodiments of the present disclosure may include less than all the components and features shown in FIG. 7. The navigational device 200 includes a microprocessor 202 that is configured and programmed with firmware to perform the features, calculations, and operations disclosed herein. The term "microprocessor" may also include the concepts of a processor and central processing unit.

Connected to the microprocessor 202 is a computer memory 204. Installed into the computer memory 204 is map data 206. The map data 206 may include one or more digital or virtual maps of a desired area. As used herein, the term "virtual" means not physically existing. The map data 206 may be downloaded from a remote server from time to time as needed by the user. The map data 206 includes data that defines a virtual 3D map of the desired area. The map data 206 may also include data that defines a virtual 2D map, such as a topographical map. The map data 206 may also include data that defines a satellite image of the desired area, such as that provided by Google Earth. The map data 206 may also include data that defines a virtual street map. The map data 206 may also include data that defines a virtual geologic map. In general, the map data 206 includes data that shows geographic terrain and physical features of an area. The map data 206 may also include other map layers such as property boundaries, hunting unit boundaries, and the like.

A GPS module 208 is connected to the microprocessor 202. The GPS module 208 receives GPS data in wireless signals from orbiting satellites. The GPS module 208 relays the GPS data, e.g., latitudinal and longitudinal coordinates, to the microprocessor 202. A radio transceiver 210 is also connected to the microprocessor 202. The radio transceiver 210 may exchange radio signals with other navigational devices. These radio signals may include two-way voice communications and two-way navigational data exchange. In an embodiment, the radio signals use one of the General Mobile Radio Service (GMRS) and the Family Radio Service (FRS).

The navigational device 200 may further include a digital display 212 for displaying information to a user. For example, the digital display 212 may display a virtual map and the navigational data to a user. The digital display 212 may also display a variety of map layers, including property boundary information. A user interface 214 receives user input to operate the navigational device 200. The user interface 214 may include a touchscreen feature incorporated into the digital display 212. The user interface 214 may also include push buttons, switches, dials, and the like.

The navigational device 200 may further include a target marking system 216. The target marking system 216 allows a user to point to and designate an uncharted location that is visible to a user. That is, the target marking system 216 allows a user to visually designate a target in sight of the user from an observation point. The target marking system 216 may take several forms as will now be described.

Figure 8:
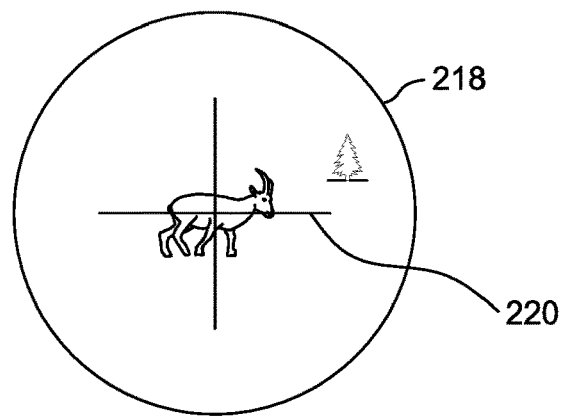
FIG. 8 depicts an optical targeting system for use with the navigational device shown in FIG. 7.

Referring to FIG. 8, in an embodiment, the target marking system 216 may comprise an optical marking system 218 that includes real or virtual crosshairs 220. The optical marking system 218 may include magnification lenses and an optical zoom feature to enlarge the image. The optical marking system 218 may take the form of a monocular, spotting scope, binoculars, or a camera lens.

Figure 9:
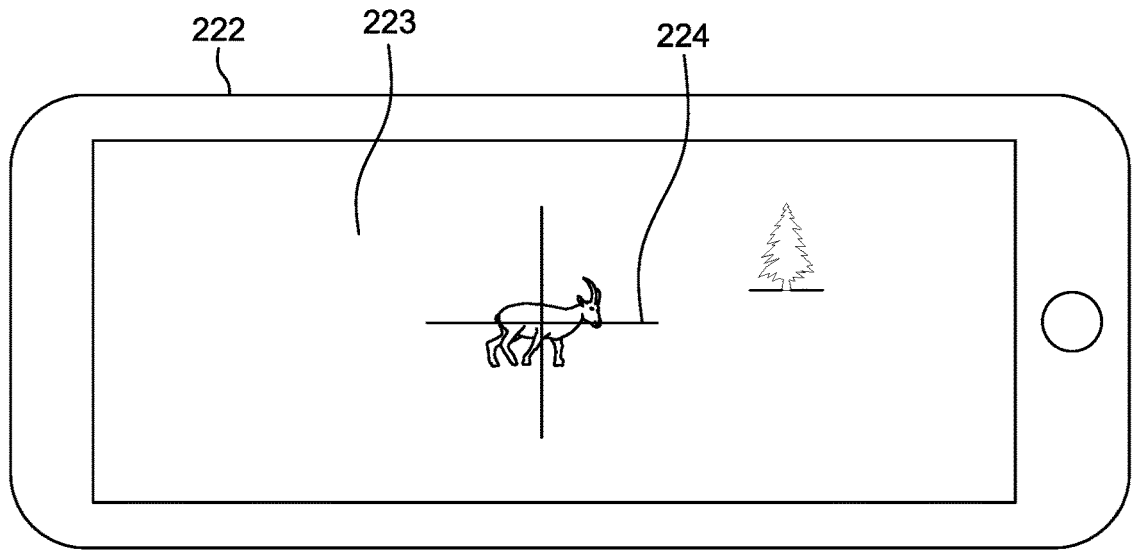
FIG. 9 depicts a digital targeting system for use with the navigational device shown in FIG. 7.

Referring to FIG. 9, in an embodiment, the target marking system 216 may include a digital marking system 222. The digital marking system 222 may include a digital display 223 that shows virtual crosshairs 224 on a captured image. The image on the digital display 223 may be captured by a digital camera. The digital display 223 of the digital marking system 222 may be part of the digital display 212 (see FIG. 7). The display 223 of the digital marking system 222 may include both optical and digital zoom features. In an embodiment, the features of the navigational device 200 may be incorporated into a smart phone having a digital camera. The virtual crosshairs 224 may be aligned with an optical axis of the digital camera.

Figure 10:
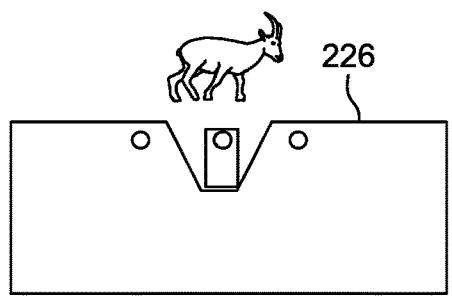
FIG. 10 depicts an open sight targeting system for use with the navigational device shown in FIG. 7.

Referring to FIG. 10, in an embodiment, the target marking system 216 may include an open eye marking system 226. In an embodiment, the open eye marking system 226 is similar to open gunsights.

Referring back to FIG. 7, the navigational device 200 may further include a digital tilt sensor 230 to measure an angle of inclination of a target marked by the target marking system 216. The digital tilt sensor 230 may include microelectromechanical (MEMS) components to determine the inclination angle. The navigational device 200 may further include a digital compass 232 to measure a bearing angle of a target marked by the target marking system 216 with respect to the Earth's magnetic fields. The navigational device 200 may further include a laser transmitter 234 and a laser receiver 236 that collectively allow for the measurement of a target distance using laser range finding.

Figure 2:
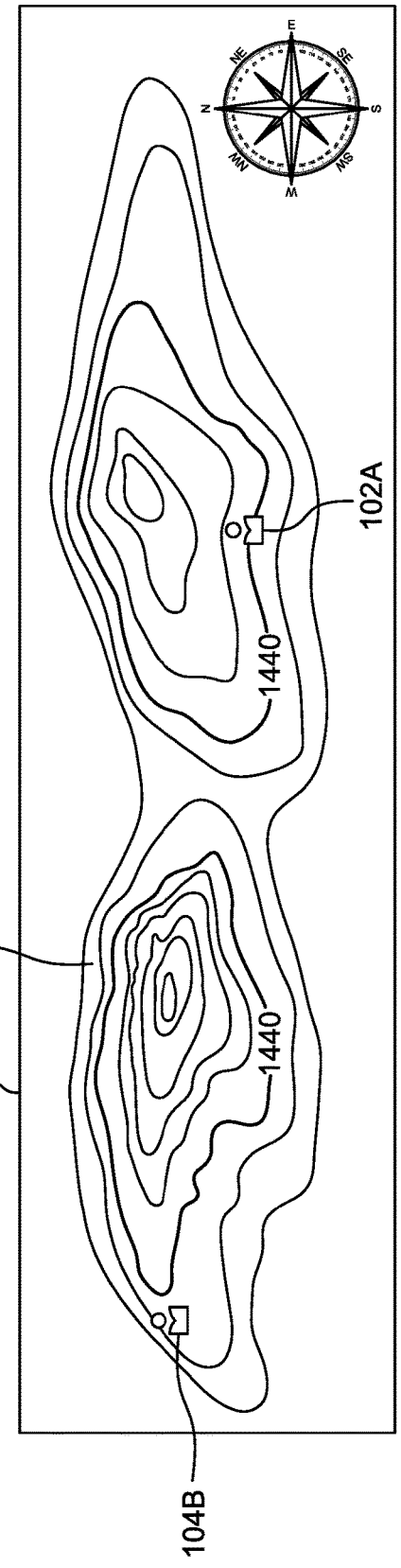
FIG. 2 shows a display of a digital map of the area shown in FIG. 1 on a display of a navigation device with the charted locations of the first user and the second user.

Referring now to FIGS. 1, 2 and 7, the display 212 of the navigational device 200 of the first user 102 may display a virtual map 110 from the map data 206. The virtual map 110 may be a topographical map, a 3D map, a contour map, a satellite image, or any other kind of map. FIG. 2 shows a 2D topographical map. Shown on the virtual map 110 is a first icon 102A that designates the location of the first user 102. Also shown on the virtual map 110 is a second icon 104B that designates the location of the second user 104. The locations of the first user 102 and the second user 104 may be charted by their respective navigational devices 200 using GPS signals received by their respective GPS modules 208.

The navigational devices 200 of the first user 102 and the second user 104 may exchange their respective GPS location data, i.e., latitude and longitudinal data, using the radio transceiver 210. As can be observed, the location of the animal 106 is not shown on the virtual map 110 because its location cannot be charted using GPS signals because the animal 106 obviously does not have a navigational device 200. The process by which the navigational device 200 of the first user 102 charts the location of the animal 106 will now be explained.

Figure 3:
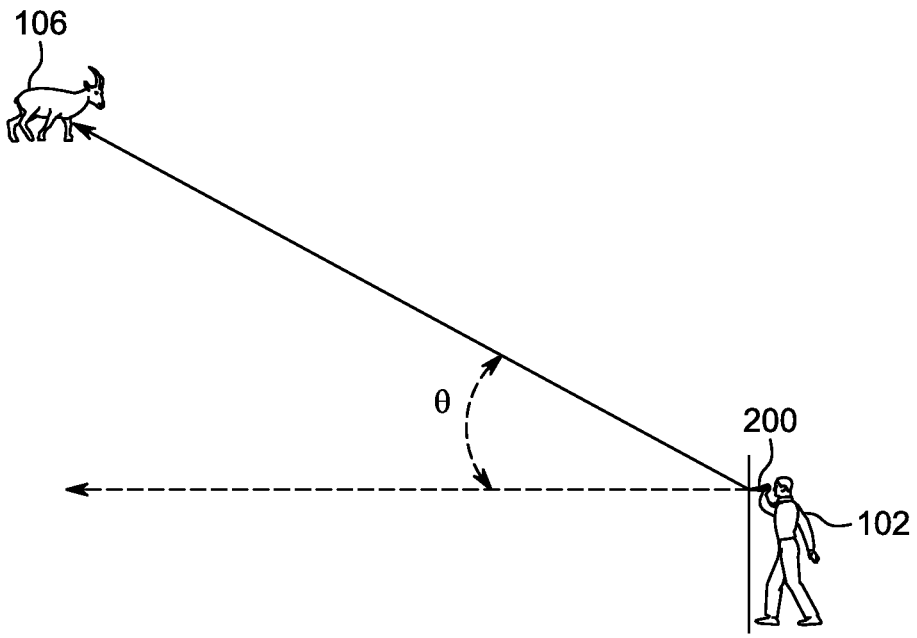
FIG. 3 depicts the first user determining an inclination angle and actual distance to the animal shown in FIG. 1 using a handheld navigation device.

Referring to FIGS. 3 and 7, the first user 102 uses the target marking system 216 of the navigational device 200 to target the animal 106. This may include aligning crosshairs onto the animal 106. Once the animal 106 has been targeted, the digital tilt sensor 230 determines an angle of inclination, Θ, in response to user input received through the user interface 214. It will be appreciated that the angle of inclination may be measured from horizontal. Also, the laser transmitter 234 and the laser receiver 236 of the navigational device 200 may collectively determine a range or actual distance to the animal 106. The angle of inclination and range information of the animal 106 is provided to the microprocessor 202.

Figure 4:
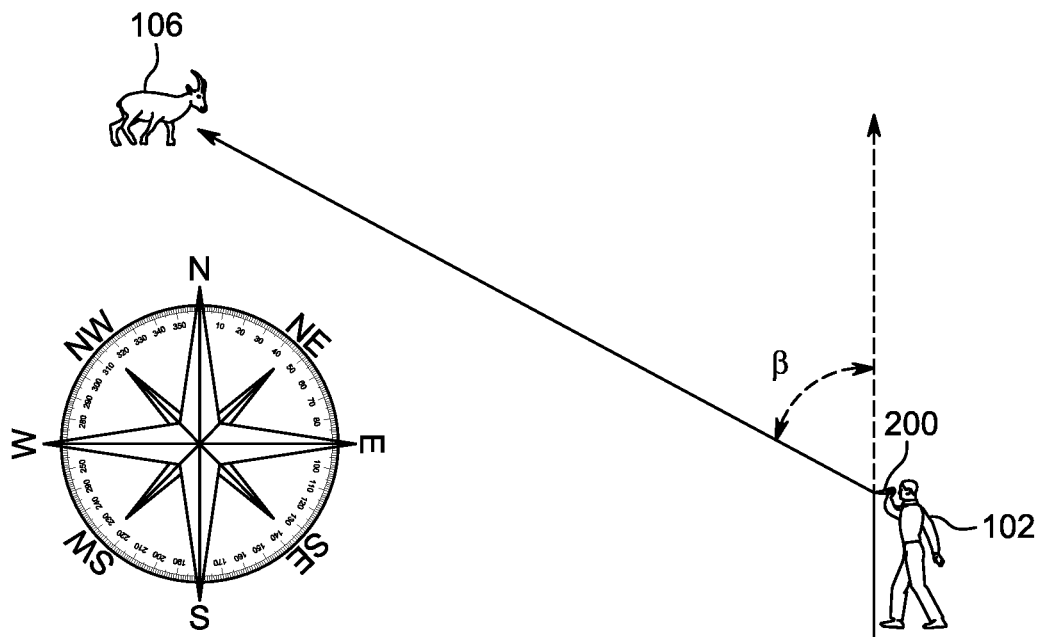
FIG. 4 depicts the first user determining a bearing angle to the animal shown in FIG. 1 using the handheld navigation device.

Referring to FIGS. 4 and 7, the digital compass 232 of the navigational device 200 may also determine a bearing angle, β, to the animal 106. In an embodiment, the bearing angle is determined relative to North to match the orientation of the virtual map 110. The bearing angle of the animal 106 is provided to the microprocessor 202. The bearing angle, the inclination angle, and the distance of the target may be determined simultaneously or nearly simultaneously by the navigational device 200 in response to user input.

Figure 6:
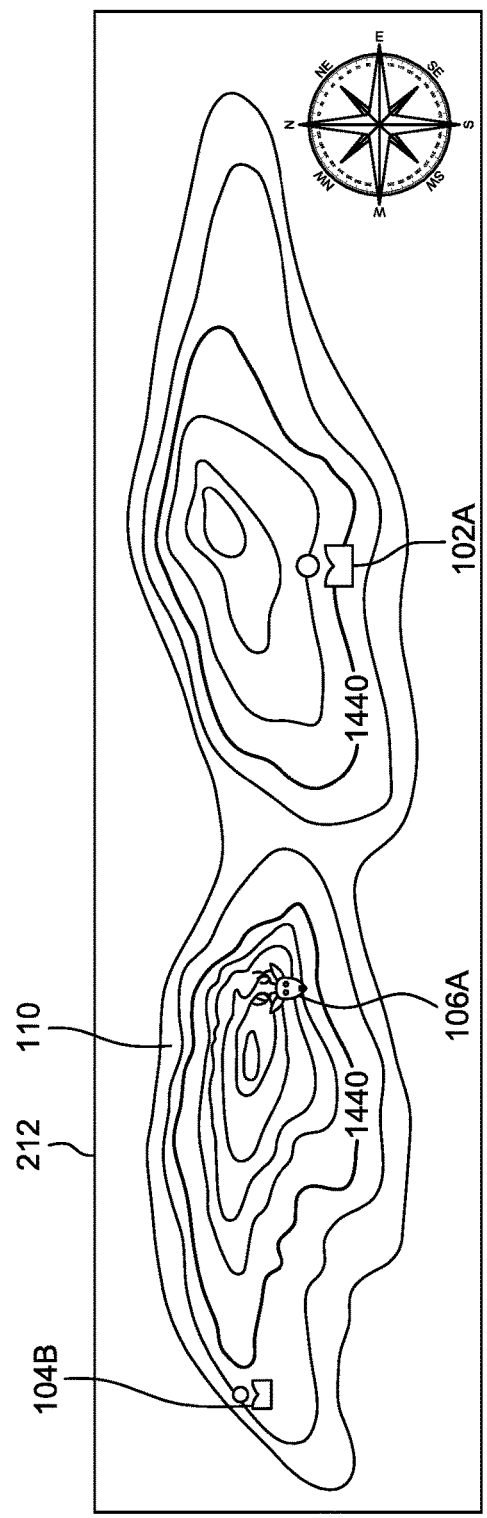
FIG. 6 shows a display of a digital map of the area shown in FIG. 1 on the display of the navigation device with the charted locations of the first user, the second user, and the animal.

Referring to FIGS. 6 and 7, where like reference numerals depict like components, using the coordinates of its current location, the bearing angle, the inclination angle, and the distance of the target, the microprocessor 202 of the navigational device 200 of the first user 102 charts the location of the target, i.e., the animal 106. It will be appreciated that the coordinates of the animal 106 may be determined using geometric principles. Once the coordinates of the animal 106 have been determined, the navigational device 200 then displays an icon 106A for the animal 106 on the virtual map 110. In addition, the coordinates of the animal 106 may be transmitted from the navigational device 200 of the first user 102 to the navigational device 200 of the second user 104 using radio signals. In this manner, the second user 104 learns the location of the animal 106 using the navigational device 200 even though the animal 106 may not be visible to the second user 104. The second user 104 may then navigate to the location of the animal 106 using the navigational device 200.

Figure 5:
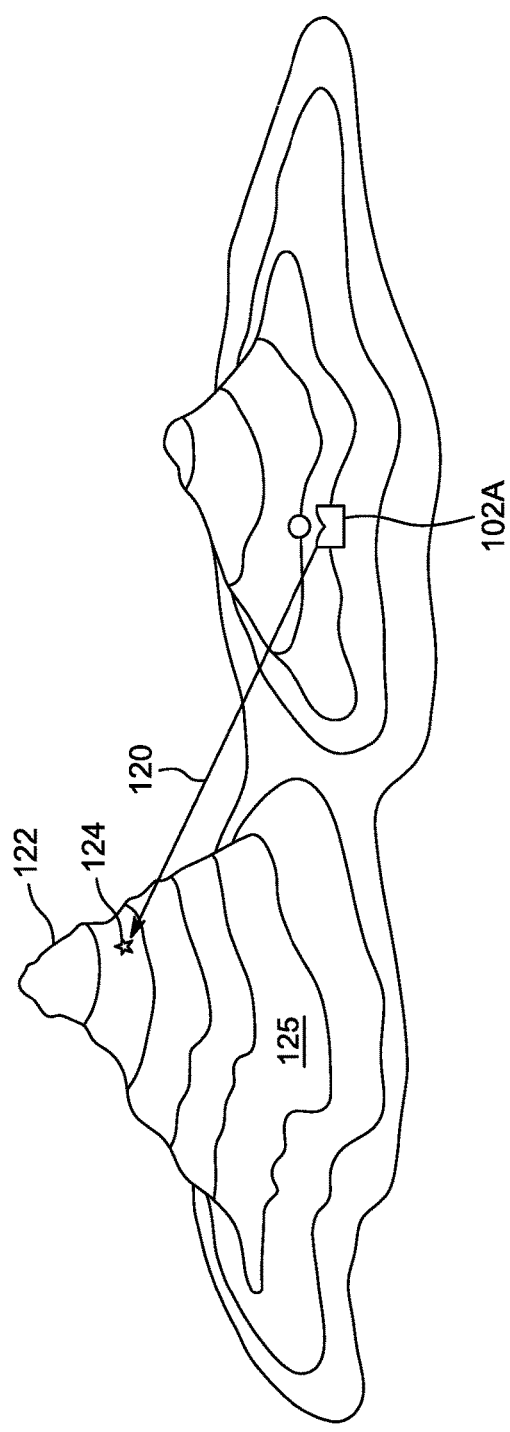
FIG. 5 depicts a microprocessor driven process of determining an intersection of a vector from user 1 to the animal's location in FIG. 1 with a digital contour map.

Referring now to FIGS. 5 and 7, where like reference numerals depict like components, often the range or distance to a target may be impossible to obtain since laser range finders have a limited range and do not work well on soft targets. It will now be explained the process by which the present disclosure can chart a location of a target without range data.

Using the coordinates of its current location, the inclination angle, and the bearing angle, the microprocessor 202 of the navigational device 200 calculates a position and direction of a virtual vector 120 in relation to a virtual 3D map 122. (The data for the virtual 3D map 122 is stored in, and retrieved from, the memory 204 of the navigational device 200.) The origin of the virtual vector 120 is the current location or observational point of the first user 102 as represented by the icon 102A. The direction of the virtual vector 120 is determined from the inclination angle and the bearing angle. The microprocessor 202 then calculates the coordinates of an intersection 124 of a surface 125 of the virtual 3D map 122 and the virtual vector 120. The intersection 124 is then designated as the charted location of the target, i.e., animal 106, and is shown on the display 212 of the navigational device 200 by the icon 106A shown in FIG. 6.

Figure 11:
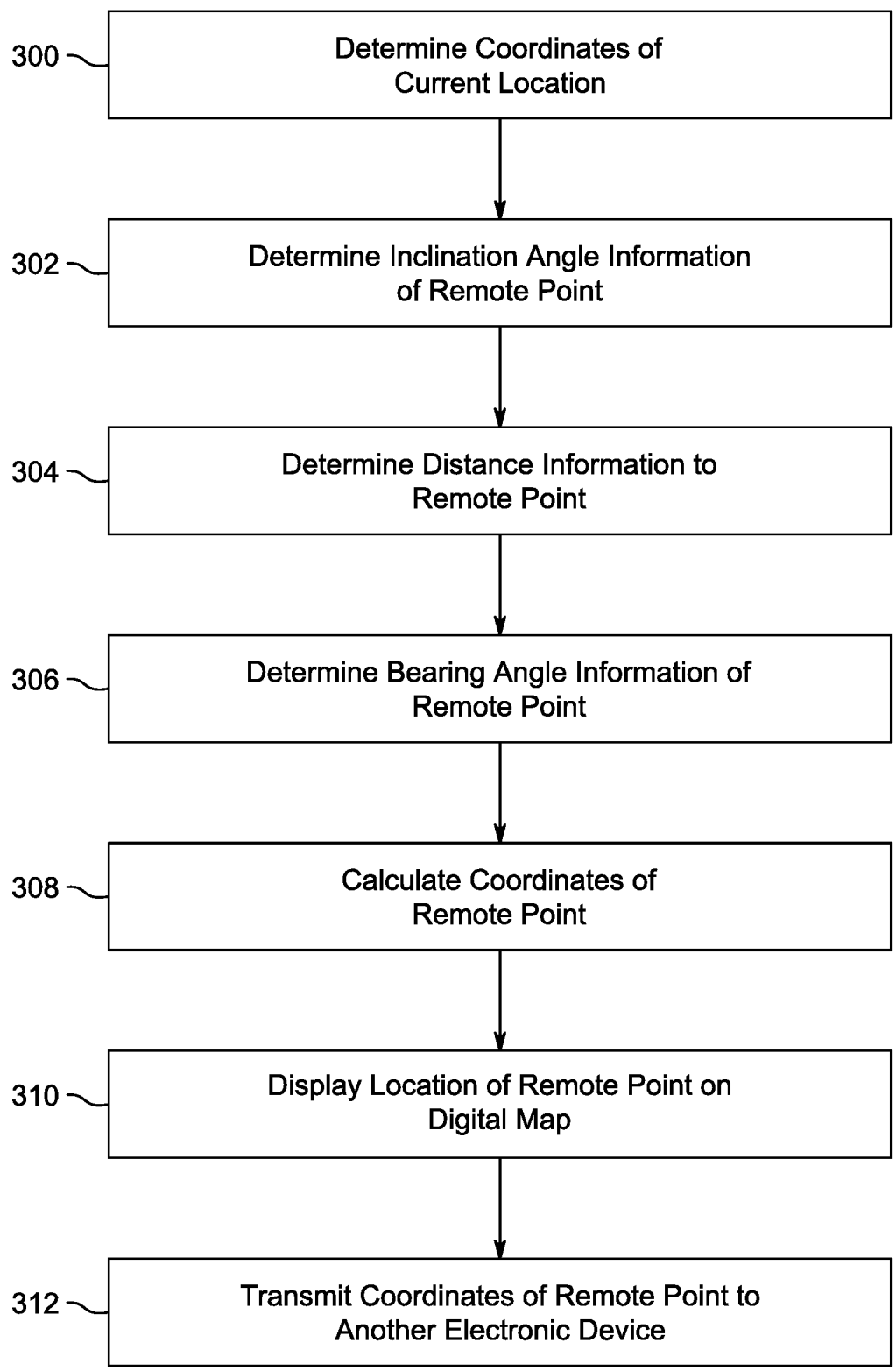
FIG. 11 is a process for charting the location of a remote point using the navigational device shown in FIG. 7.

Referring to FIG. 11, a process for charting the coordinates of a remote point using the navigational device 200 is shown. At step 300, the microprocessor 202 of the navigational device 200 obtains the coordinates of its current location or observational point using the GPS module 208. At step 302, the microprocessor 202 determines an inclination angle of the remote point from the observation point using the digital tilt sensor 230 while the remote point is targeted by the target marking system 216. At step 304, the microprocessor 202 determines a distance to the remote point from the observational point using the laser transmitter 234 and the laser receiver 236. At step 306, the microprocessor 202 determines a bearing angle to the remote point from the observational point using the digital compass 232. At step 308, the microprocessor 202 charts the remote point by calculating the coordinates of the remote point using the current location coordinates, the angle of inclination, the distance, and the bearing angle. At step 310, an icon showing the location of the remote point on a virtual map is displayed to the user on the digital display 212. At step 312, the charted location, i.e., the coordinates, of the remote point is transmitted to another navigational device 200. The coordinates may include longitudinal and latitudinal information. In addition, the microprocessor 202 may calculate navigation directions to the remote point.

Figure 12:
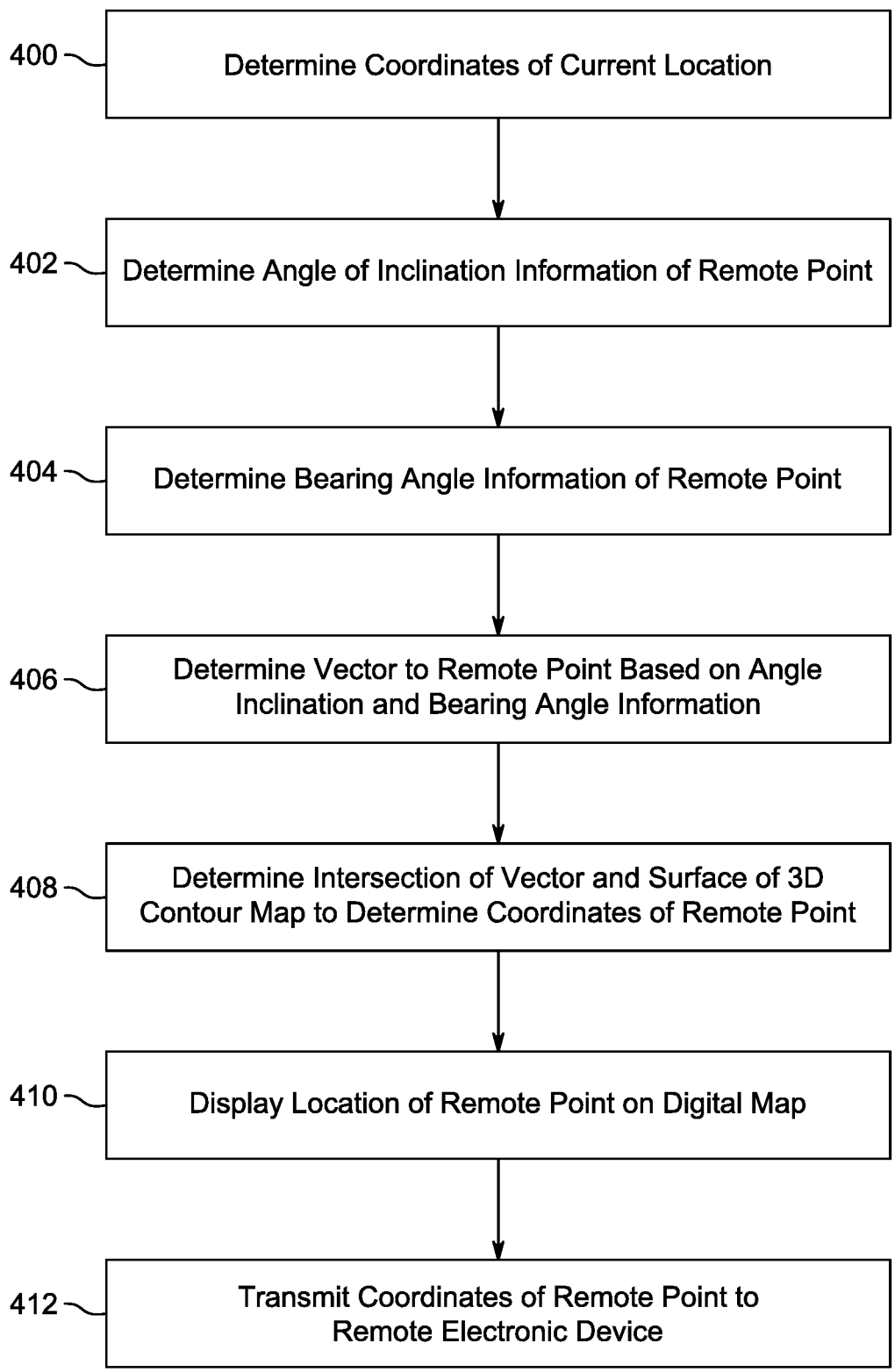
FIG. 12 is a process for charting the location of a remote point using the navigational device shown in FIG. 7.

Referring to FIG. 12, a process for charting a location of a remote point without distance or range data using the navigational device 200 is shown. At step 400, the microprocessor 202 of the navigational device 200 obtains the coordinates of its current location or observational point using the GPS module 208. At step 402, the microprocessor 202 determines an inclination angle of the remote point from the observational point using the digital tilt sensor 230 while the remote point is targeted by the target marking system 216. At step 404, the microprocessor 202 determines a bearing angle to the remote point from the observational point using the digital compass 232. At step 406, the microprocessor 202 calculates a virtual vector in relation to a virtual 3D map using the coordinates of the observational point, the angle of inclination, and the bearing angle. At step 408, the microprocessor 202 determines an intersection of the virtual vector and a surface on the virtual 3D map to chart the coordinates of the remote point. At step 410, an icon showing the location of the remote point on a virtual map is displayed on the digital display 212 the navigational device 200. At step 412, the coordinates of the remote point are transmitted to another navigational device 200. In addition, the microprocessor 202 may calculate navigation directions to the remote point.

Figure 13:
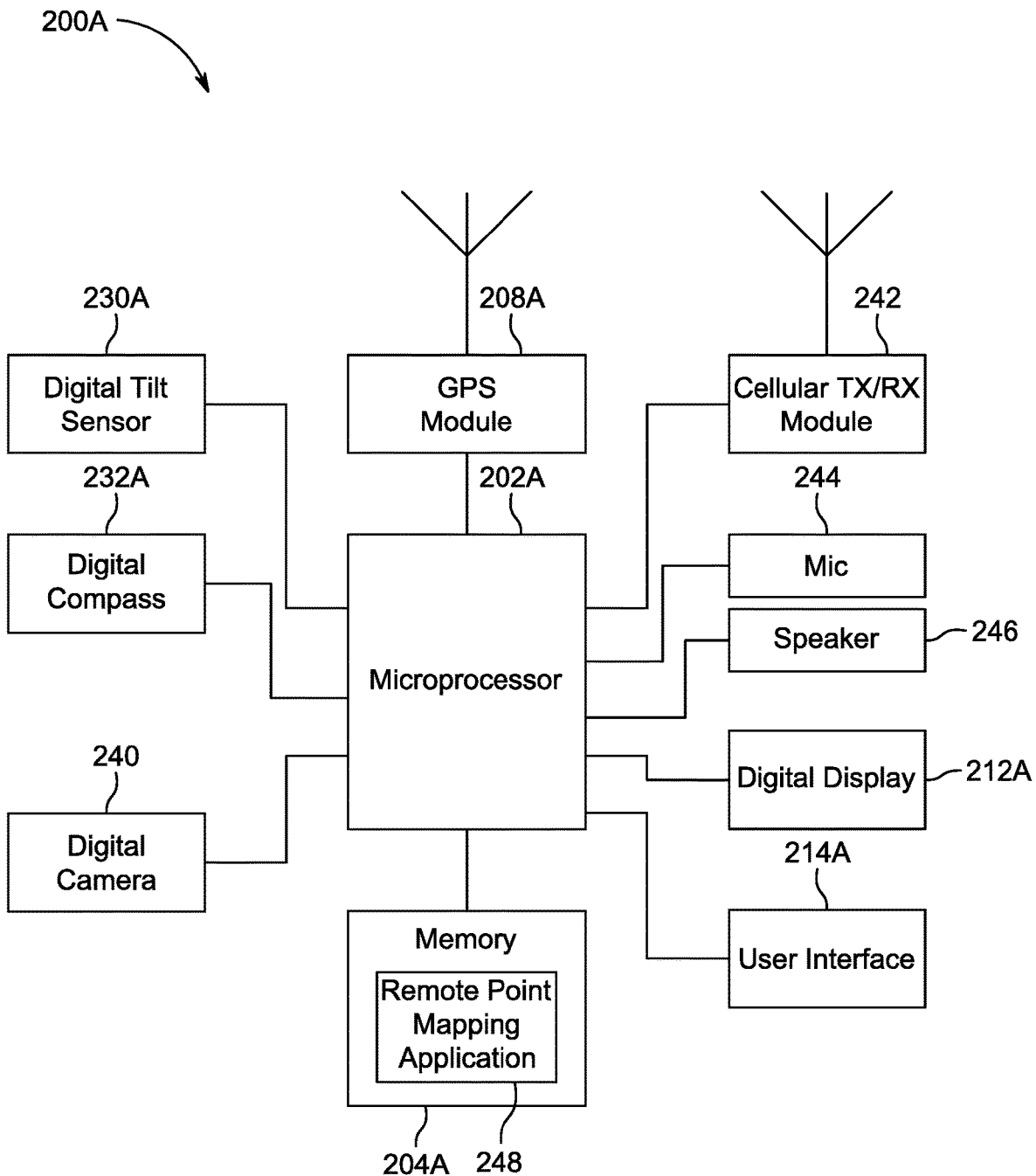
FIG. 13 depicts a diagram of the components of a navigation device according to an embodiment of the present disclosure.

Referring to FIG. 13, where like reference numerals depict like components, there is depicted a navigational device 200A according to an embodiment of the present disclosure. The navigational device 200A may take the form of a smart phone with an integrated camera. In particular, the navigational device 200A may comprise a microprocessor 202A, a memory 204A, a GPS module 208A, a digital display 212A, a user interface 214A, a digital tilt sensor 230A, and a digital compass 232A having the same features and functionality as described above.

The navigational device 200A may further comprises a cellular transmission module 242 that allows the navigational device 200A to engage in two-way communications over a cellular network. In addition, the cellular transmission module 242 allows the navigational device 200A to update and download data from a wireless cellular service. The navigational device 200A may further include a microphone 244 and a speaker 246 to facilitate voice communications.

Installed in the memory 204 is a remote point mapping (RPA) application 248. The RPA application 248 may be downloaded from an online location, such as an online store available on the Internet. The RPA application 248 allows the navigational device 200A to chart remote locations that are visible to a user. That is, the microprocessor 202A executes the instructions of the RPA application 248 to perform the features and functionalities that will now be described with reference to FIG. 14.

Figure 14:
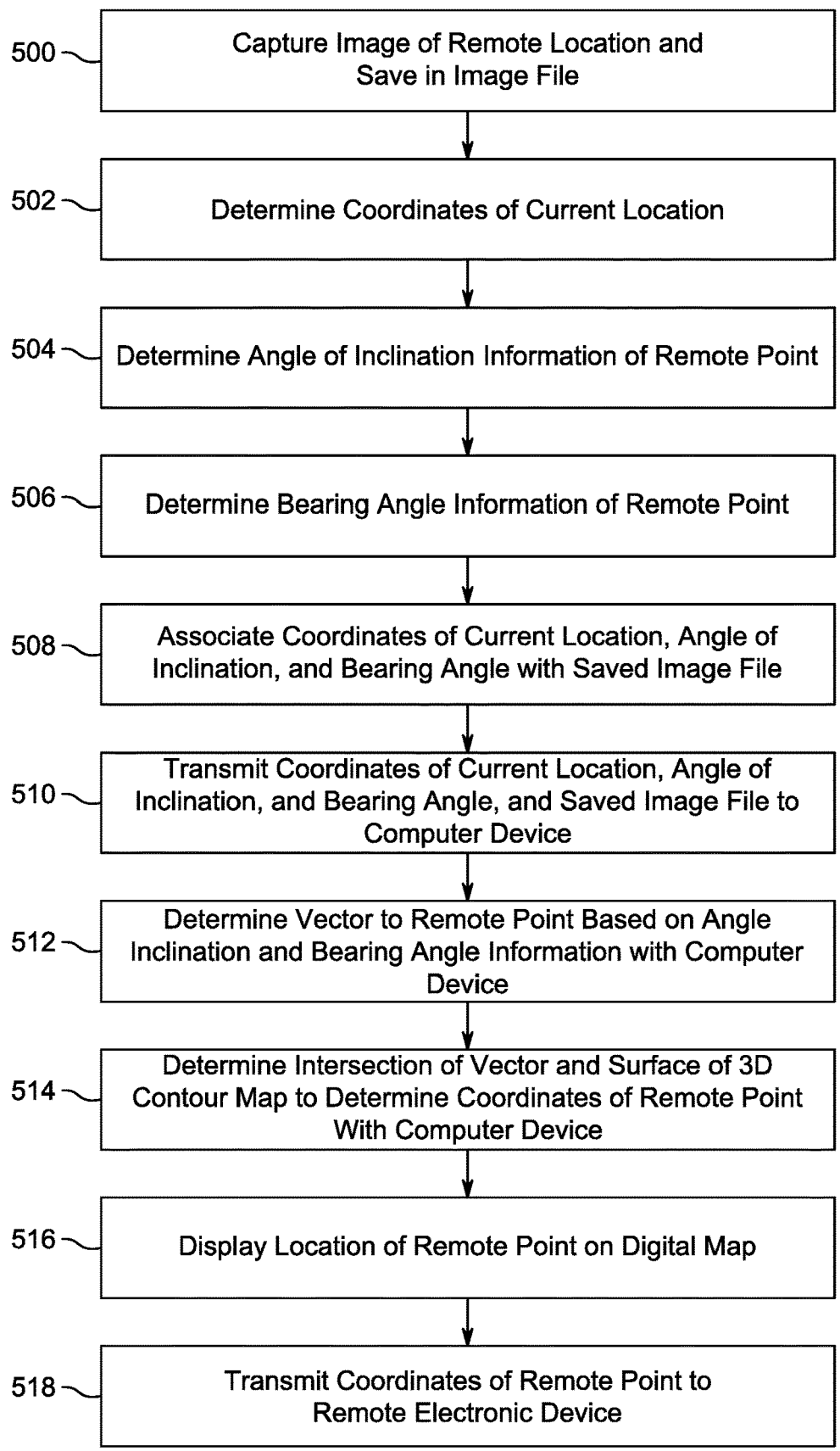
FIG. 14 is a process for charting the location of a remote point using the navigational device shown in FIG. 13.

Referring now to FIG. 14, the microprocessor 202A executes the RPA application 248 to perform the following processes. At step 500, the microprocessor 202A uses the digital camera 240 to capture an image. The image may be shown on the digital display 212A such as illustratively shown in FIG. 9. The RPA application 248 may generate virtual crosshairs on the digital display 212A to allow a user to mark the target remote location as shown in FIG. 9. In an embodiment, the virtual crosshairs are aligned with the optical axis of the camera lens.

The microprocessor 202A saves an image file of the image captured the digital camera 240. At step 502, the microprocessor 202A determines its current location coordinates using the GPS module 208A. At step 504, the microprocessor 202A determines an angle of inclination of the remote point using the digital tilt sensor 230A. At step 506, the microprocessor 202A determines a bearing angle of the remote point using the digital compass 232A. Steps 502, 504, and 506 may occur at the same time that the microprocessor 202A captures and saves the image in step 500.

At step 508, the microprocessor 202A associates the coordinates of the current location, the angle of inclination, and the bearing angle with the saved image file as metadata. At step 510, the microprocessor 202A transmits the metadata and the saved image file to a remote computing device. For example, the microprocessor 202A may upload the image file to a desktop or laptop computer, a tablet computer, an online server, a server, or some other computing device.

At step 512, a processor of the remote computing device determines a virtual vector to the remote point based upon the coordinates of the current location, the angle of inclination, and the bearing angle. At step 514, the remote computing device may determine an intersection of a virtual vector and a surface of a 3D map to determine the coordinates of the remote point. At step 516, the remote computing device may display the location of the remote point on a virtual map using an icon. At step 518, the remote computing device may transmit the coordinates of the remote point to another remote electronic device.

It will be appreciated that the above process performed by the microprocessor 202A allows a user to capture an image of a remote point. Later, the user can determine the exact coordinates of the location of the remote point shown in the image. In addition, the metadata and/or coordinates can be permanently associated with the image file so that the location information can be accessed at a later date.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

The invention claimed is:

1. A navigational device comprising:
   a microprocessor;
   a target marking system for visually marking a remote point from an observation point;
   a digital tilt sensor for determining an inclination angle for the remote point from the observational point;
   a digital compass for determining a bearing angle for the remote point from the observational point; and
   a GPS module for providing coordinates for the observation point;
   wherein the microprocessor is programmed to determine coordinates of the remote point based upon the inclination angle, the bearing angle, and the coordinates of the observation point;
   a memory having map data stored therein;
   wherein the microprocessor is further programmed to determine the coordinates of the remote point further based on the map data;
   wherein the map data comprises a virtual 3D map.

2. The navigation device of claim 1,
   further comprising a laser transmitter and a laser receiver for providing distance data to the remote point from the observation point;
   wherein the microprocessor is further programmed to determine the coordinates of the remote point further based upon the distance data.

3. The navigational device of claim 1, wherein the microprocessor is further programmed to calculate a vector based upon the inclination angle, the bearing angle, and the coordinates of the observation point.

4. The navigational device of claim 3, wherein the microprocessor is further programmed to determine the coordinates of the remote point from an intersection of the vector and a surface of the virtual 3D map.

5. The navigational device of claim 1, wherein the microprocessor determines the coordinates of the remote point without range data.

6. The navigational device of claim 1, wherein the target marking system comprises one or more of an optical system, a digital camera, and open sights.

7. The navigational device of claim 1, further comprising a radio transceiver.

8. A method of determining coordinates of a remote point from an observation point, said method comprising:
   marking the remote point using a target marking system from the observation point;
   determining coordinates of the observation point;
   determining an inclination angle of the remote point from the observation point;
   determining a bearing angle of the remote point from the observation point;
   determining a virtual vector based upon the coordinates of the observation point, the inclination angle, and the bearing angle;
   determining a point of intersection of the virtual vector with a surface of a virtual 3D map; and
   determining the coordinates of the remote point based upon the point of intersection.

9. The method of claim 8, wherein the target marking system comprises one of an optical system, a digital display, and open sights.

10. The method of claim 8, further comprising displaying an icon on a digital map on a display, the icon representing a location of the remote point on a digital map.

11. The method of claim 8, further comprising transmitting the coordinates of the remote point over a wireless transmission.

12. The method of claim 8, wherein the coordinates of the remote point comprise latitudinal and longitudinal information.

13. The method of claim 8, further comprising downloading the virtual 3D map from a computer server.

* * * * *